United States Patent [19]

Kraus et al.

[11] Patent Number: 4,761,319

[45] Date of Patent: Aug. 2, 1988

[54] CLOSURE COVER

[75] Inventors: Willibald Kraus, Grunstadt; Ute Weinheimer, Ramsen, both of Fed. Rep. of Germany

[73] Assignee: TRW United-Carr GmbH, Fed. Rep. of Germany

[21] Appl. No.: 948,238

[22] Filed: Dec. 31, 1986

[30] Foreign Application Priority Data

Jan. 3, 1986 [DE] Fed. Rep. of Germany ....... 3600069

[51] Int. Cl.⁴ .............................................. B32B 3/06
[52] U.S. Cl. ........................................ 428/99; 428/64; 428/66; 428/120; 428/63; 220/307; 49/465
[58] Field of Search ...................... 428/64, 66, 99, 119, 428/120, 63; 49/463, 465; 220/307

[56] References Cited

U.S. PATENT DOCUMENTS

| | | | |
|---|---|---|---|
| 2,497,827 | 2/1950 | Trafton | 220/307 |
| 2,741,396 | 4/1956 | Lolbl | 220/307 |
| 4,363,420 | 12/1982 | Andrews | 220/307 |
| 4,495,234 | 1/1985 | Tominaga et al. | 428/122 |
| 4,504,009 | 3/1985 | Bolk et al. | 220/307 X |

*Primary Examiner*—Alexander S. Thomas
*Attorney, Agent, or Firm*—Fay, Sharpe, Beall, Fagan, Minnich & McKee

[57] ABSTRACT

A closure cover is formed of plastic and intended for closing an opening in a panel, such as a wall or floor panel of a motor vehicle. The closure cover includes a cover plate sized to overlie the opening and having a multiplicity of resilient holding elements depending therefrom to extend through the opening adjacent the periphery thereof. The holding elements include jaw portions extending laterally to engage under the periphery of the opening. The jaw portions of adjacent holding elements are located at different distances from the cover plate. Preferably the locations of the jaw elements describe a plurality of continuous curves relative to the cover plate to allow the same closure cover to be used on panels of a range of thicknesses.

9 Claims, 2 Drawing Sheets

CLOSURE COVER

BACKGROUND OF THE INVENTION

The subject invention is directed to a plastic closure cover especially suited for closing an opening in a panel, such as a wall or floor panel of a motor vehicle. More particular, the invention concerns a closure cover of the type comprising a cover plate having depending holding elements which extend through the opening and grip behind the peripheral edge of the opening.

Closure covers of the general type under consideration are known in the art. One known type shown in British patent No. 734,857 has four springy, elastic holding elements which are mounted across from one another to grip behind the peripheral edge of an opening to be closed. The holding power of the holding elements in this prior type is relatively limited and their design is such that they are set for only one specific panel thickness. If the panel thickness is changed, either intentionally or as a result of tolerance variations, the same closure cover cannot be used. Consequently, the manufacturer must stock a large number of different versions of closure covers in order to satisfy all demands arising in the motor vehicle industry.

Also known in the prior art is a closure cover for drain holes in the floor panels of motor vehicles. A closure cover for this purpose is shown in German printed specification No. 1,840,793 and consists of a plate with an outer, U-shaped annular tee-slot and arms adapted to be self-supporting and located approximately parallel to each other. An outer arm has at about half height a round circumferential gripping lug as well as a circular flange at its upper end. By the interaction of the circular flange and the gripping lug there results a gripping-behind of this annular holding element into the panel opening in the motor vehicle. Again this holding element is only suited to hold the closure cover securely to a wall or floor of a given panel thickness. As soon as tolerance variations occur, or if different thicknesses must be accounted for over a larger area, this known closure cover can no longer be used.

BRIEF DESCRIPTION OF THE INVENTION

Accordingly, it is the purpose of the subject invention to form a closure cover of the aforementioned type such that an opening in the wall or floor panel of a motor vehicle can be closed properly even if very large tolerance variations exist, and/or which can be used on panels of a variety of thicknesses.

The problem is solved according to the invention by providing several holding elements placed next to each other to depend about the periphery of the opening with each holding element having a holding jaw for engaging the wall or floor area and with each holding jaw displaced in height with respect to the preceding holding jaw over at least a part of the periphery of the opening. The interaction of the holding elements which are placed next to each other, and which have holding jaws displaced in height with respect to each other, provides the advantage, according to the invention, that even very large tolerances in panel thicknesses or the presence of collet holes in the wall or floor panels of a motorized vehicle can be overcome. By means of the periodically repeating displacement of the distance of the holding jaws from the cover plate there is produced, in a simple way, a holding action of the closure cover even for very great differences in wall or panel thicknesses. Thus, from this there results a simplification in part storage. That is, a single cover plate can function in a variety of different situations.

The height displacement of the holding jaws can proceed in the form of a plurality of continuous curves with the continuous curves formed to have the same shape and direction. This produces a type of thread pitch and where, distributed over the periphery of an opening, several such thread pitches can exist.

In a further version of the invention, the height displacement of the jaws can repeat over one-third segments of the periphery of the opening, so that as a result at least three holding jaws are simultaneously engaged to hold the closure cover securely in the opening.

According to another characteristic of the invention, the height displacement of the holding jaws can be formed such that the locations of the jaws describe equally proceeding continuous curves of equal slope. Here again, each holding element can consist of a springy arm running parallel to the axis of the cover plate. Preferably, the holding jaws are on the outside of the arms and the individual arms are arranged on the cover plate at a distance from one another which is smaller than the width of a single arm. Normally, after one third of the periphery of the opening, a holding element with the highest placed holding jaw is adjacent to a holding element with the lowest placed holding jaw so that there results the curve-like shape of the locations of the holding jaws, which was previously called thread pitch.

Each holding element is placed to extend from the underside of the cover plate and the cover plate can have a reinforcement in the space bounded by the holding elements. This reinforcement can be made in the form of a circumferential flange where the height of the circumferential flange is preferably smaller than or equal to the height of the arms constituting the holding elements. According to a more specific aspect of the invention, the arms can have reinforcement areas lying across from and in opposed relationship to the circumferential flange. Furthermore, the edge of the cover plate protruding beyond the holding elements can be made to be resilient and springy or can be sealed with some other plastic. In addition, each arm can be equipped with a reinforcement rib or fillet on the inside in the area where it fastens to the cover plate.

BRIEF DESCRIPTION OF THE DRAWINGS

The above and other objects and advantages will become apparent from the following description when read in conjunction with the accompanying drawings wherein.

DETAILED DESCRIPTION OF PREFERRED EMBODIMENTS

Figure 1:
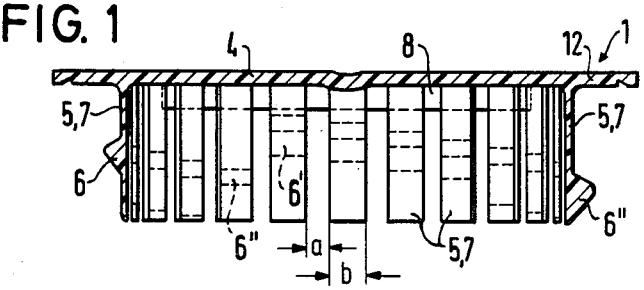
FIG. 1 is transverse cross-sectional view of a closure cover formed in accordance with the preferred embodiment of the subject invention.

Referring more particularly to the drawings wherein the showings are for the purpose of illustrating perferred embodiment of the invention only and not for the purpose of limiting same, FIG. 1 shows a transverse sectional view of closure cover 1 molded of plastic and comprising a generally circular, imperforate closure plate 4 having a multiplicity of integral holding elements 5 depending therefrom. Each holding element 5 is formed as a resilient springy arm 7 extending parallel to the axis of the closure plate 4. Each arm 7 includes an integral holding jaw, for instance a triangular holding jaw or catch member 6. The closure cover has a number of such holding elements 5 which are placed next to each other and laid out in a pattern to so that their external surfaces generally correspond to the inner peripheral shape and size of the opening to which the cover is to be applied. As is apparent, the holding elements are arranged to be closely received in the opening. Thus, when inserted into the opening the inclined lower surfaces of the jaws 6 engage the edge of the opening and, through a cam-like action, deflect the arms 7 radially inward. After the jaws pass through the opening, the arms deflect back to their original position with certain of the jaws engaged with the underside of the opening in a manner which will be described.

The individual arms 7 are positioned at a distance "a" from each other which can be smaller than the width "b" of an individual arm 7.

According to the invention, and as illustrated in FIG. 1, the holding jaw 6 on each corresponding holding element 5 is displaced in height (i.e. its distance from the underside of cover plate 4) with respect to the preceding holding jaw. According to FIG. 1 there is a rise on the right side from the lowest placed holding jaw 6" to the next one, where the holding jaw following the second one is raised until finally the highest holding jaw 6' is reached. This rise can be formed to describe the shape of a continuous curve.

Figure 2:
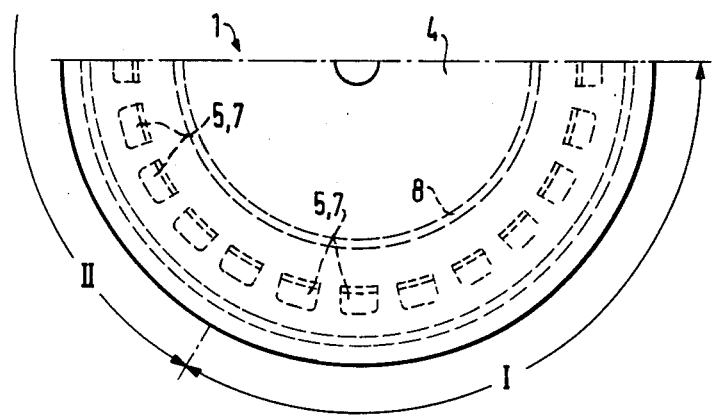
FIG. 2 is a partial top view of the closure cover of FIG. 1.

According to the embodiment of FIGS. 1 and 2, the height displacement of the jaws describes a repetitive pattern over one-third portions of the circumference of the opening to be closed. Thus, for a circular opening, the displacement of the jaws describes continuous curves over 120° segments (I and II). The height displacement is such that each of the continuous curves in the segments has equal slope. That is, from 0° to 120° the holding jaws rise from the location of jaw 6" up to the location of jaw 6'; then the curve is interrupted and there again follows a low-placed holding jaw 6'", which again is followed by rising jaws over 120° until the last holding jaw in this section corresponds to the height of the holding jaw 6'. This provides three continuous curves distributed over 120° segments which are formed by the holding jaws 6 attached to the individual holding elements 5. Thus the panel thickness range on which the cover can be installed extends from the height of the lowest holding jaw 6" to the height of the highest holding jaw 6'.

Instead of the 120° division it is also possible to provide a division into four parts, (i.e. 90° segments), or into five parts or even greater divisions with a corresponding number of continuous curves described by the location of holding jaws 6. There is also the possibility to change the spacings "a" between the individual arms 7 and for the spacing to approximate the width "b" of the individual arms.

Figure 7:
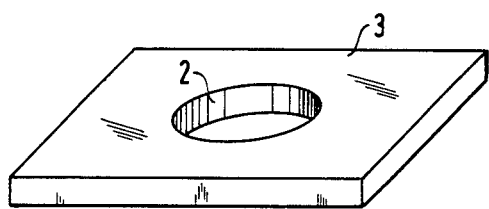
FIG. 7 is a perspective view of an opening in the wall or floor panel of a motor vehicle.
Figure 8:
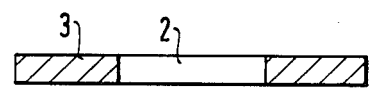
FIG. 8 is a cross-sectional view through the opening shown in FIG. 7.

As can be seen in FIGS. 1 and 2, each holding element 5 extends from the underside of the cover plate 4 parallel to the axis with an edge or rim 12 provided to extend outwardly over the peripheral edge of the opening to be closed. Such an opening is shown in FIGS. 7 and 8. As illustrated, there exists a wall or floor area 3 into which an opening 2 has been incorporated. The thickness of the wall or floor area can now vary with great tolerances since upon insertion of the closure cover 1 of the invention with a division into three segments or 120° of the differential height holding jaws, at least three holding jaws will always grip behind the opening 2 and thus hold the closure cover securely. That is, at least one holding element 5 in each section I and II, and the other section (not shown) is capable of providing the correct engagement in accordance with the thickness of the wall or floor area 3.

Figure 9:
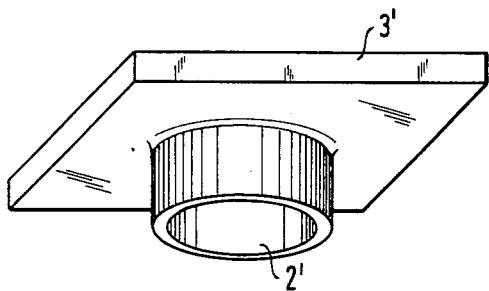
FIG. 9 is a perspective view of a collet type opening in the wall or floor panel of a motor vehicle; and, FIG. 10 is a cross-sectional view through the collet type opening shown in FIG. 9.
Figure 10:
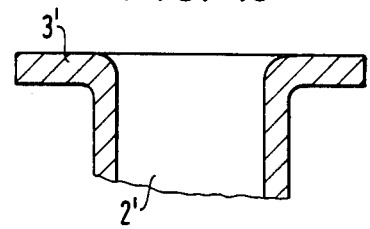

According to the invention it is also possible to use the closure cover to close off collet holes of the type shown in detail in FIGS. 9 and 10. In the fabrication of such collet holes 2' in a wall or floor panel 3', very great differences can sometimes occur in the collet height, (e.g. up to 5 mm as shown schematically in FIG. 10). The closure cover of the invention is able to compensate for all such variations because of the height displacement of the holding jaws 6. In the most unfavorable case there is always at least one holding jaw of each section I, II, etc. that is engaged and gripped behind the collet hole 2' to thus effect a secure closure.

This secure closure is assured even when, for example, the floor underside area is coated with plastic applied under high pressure. The spring action of the arms 7 and the holding jaws 6 leads to secure holding of the closure cover in the opening 2 or 2' with proper closure of the latter.

The cover plate 4 can be reinforced in the space bounded by the holding elements 5. According to FIGS. 1 and 2, the reinforcement can have the shape of a circumferential flange or collar 8. The height of the circumferential flange or collar can be shorter in the embodiments of FIGS. 1 to 5 than the height of the holding elements 5.

Figure 3:
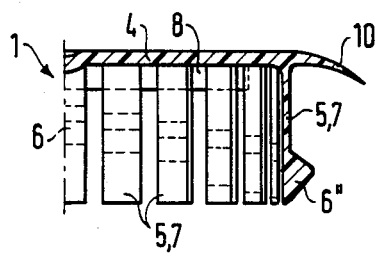
FIGS. 3-6 are partial transverse cross-sectional views of modified cover members formed in accordance with the invention.
Figure 4:
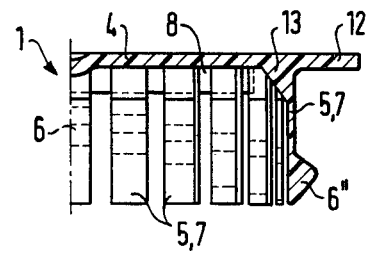

FIG. 3 shows a version in which the outer edge 10 of the cover plate 4 is formed in the shape of a lip with spring action. When this version is installed, the lip-shaped edge 10 resiliently engages the area surrounding the opening and applies an upward bias to the closure cover. This produces a better seal between the cover plate and the panel and an improved engagement between the jaws and the underside of the opening. Otherwise the version according to FIG. 3 is identical with the version in FIGS. 1 and 2, i.e. the springy arms 7 and curve-shaped path described by the locations of the holding jaws 6.

Figure 5:
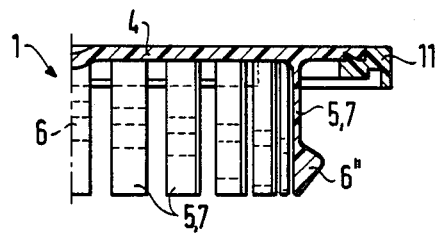

In the structural mode as shown in FIG. 5, the edge of the cover plate 4 is formed of a different plastic 11 which has a lower melting temperature as compared to the plastic of which the body of closure cover 1 is made. This provides the opportunity to make a fluid tight joint between the closure plate 4 and the panel. That is, after the closure cover is inserted into an opening 2 or 2', heating such as results during passage through paint drying ovens or the like, will cause the plastic 11 to soften or melt and bond to the associated panel.

Figure 6:
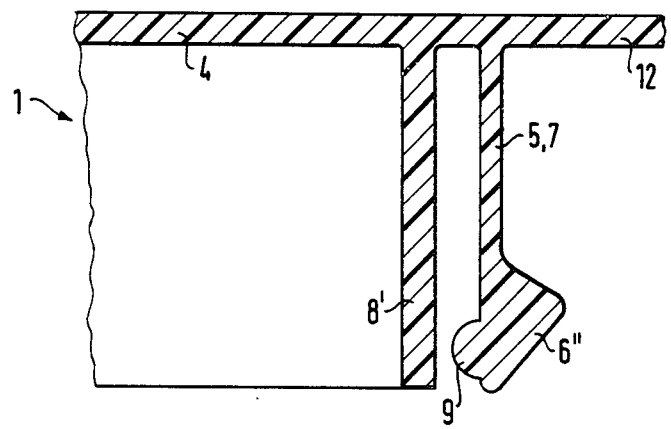

FIG. 6 shows a structural version in which the circumferential reinforcing flange or collar 8' is as high as that of the springy arms 7 forming the holding elements 5. Here there is additionally the possibility of equipping the arms with reinforcement areas in the form of protuberances 9 which lie across from and face the circumferential flange or collar 8'. The areas 9 act to limit the radial inward movement of the arms 7. There is also the possibility, not shown in more detail, to provide the circumferential flange or collar 8' with a support or protuberance which always lies across from the inside of the springy arms 7.

All structural embodiments shown in FIGS. 1 to 6 have in common that holding elements 5, in the shape of springy arms 7, are placed close to one another and wherein each of the holding elements 5 has a holding jaw 6, with the holding jaw of each arm displaced in height with respect to the adjacent jaws. The height displacement is preferably such that a continuous upward sloping curve results which extends over one part of the periphery of the opening 2 or 2' to be closed, as shown in FIGS. 7 to 10. Also conceivable are divisions for circular openings by 120°, by 90° and by smaller sectors where the locations of the holding jaws 6 always form a continuous curve.

By means of the continuous curved lay-out of the holding jaws of the closure cover 1 of the invention, it is possible to compensate for even very great tolerances in collet holes of the type shown in FIGS. 9 and 10 and to close off the corresponding opening 2' securely with the closure cover. Even smooth wall and floor panels 3 can be closed securely with respect to their opening 2 with the closure cover of the invention.

The invention has been described in great detail sufficient to enable one of ordinary skill in the art to make and use the same. Obviously, modification and alterations of the preferred embodiments will occur to others upon a reading and understanding of the specification. It is intentioned to include all such modifications and alterations as part of the invention insofar as they come within the scope of the appended claims.

What is claimed is:

1. In a closure cover member for closing an opening in a panel, such as a wall or floor panel of a motor vehicle, said member comprising a molded plastic cover plate with integrally formed holding elements extending from the cover plate for entering through the opening and engaging behind the peripheral edge of the opening, the improvement comprising:
   a multiplicity of said holding elements in the form of elongated resilient arms of equal length extending perpendicular to the cover plate and located in closely spaced side-by-side aligned relationship continuously about said cover plate at a location generally corresponding to the peripheral edge of the opening to which said cover member is to be applied, each said holding element including a laterally extending integral jaw portion for engaging under the peripheral edge of the opening, the jaw portions of said holding elements being located at at least three different distances from the cover plate and at least a plurality of circumferentially spaced ones of said holding elements having jaw portions located at the same distance from the cover plate to provide a plurality of sets of said holding elements with each set including at least three separate arms having jaw portions adapted to engage at the same distance from the cover plate, the locations of said jaw portions describing a plurality of continuous curves of uniform slope extending over no more than about one-third of the periphery of the opening.

2. The closure cover member as defined in claim 1 wherein said individual arms are spaced from the next adjacent arm a distance less than the width of an individual arm.

3. The closure cover member as defined in claim 1 wherein the cover plate includes reinforcement means lying in the space enclosed by said holding elements.

4. The closure cover member as defined in claim 1 wherein said reinforcement means comprises a sleeve-like element extending from said cover plate generally parallel to said arms.

5. The closure cover member as defined in claim 4 wherein said sleeve-like element extends from said cover plate a distance no greater than the length of said arms.

6. The closure cover member of claim 4 whereing said arms each include a reinforcement element extending from said arms toward said sleeve-like element to limit the deflection of said arms in the direction toward said sleeve-like element.

7. The closure cover member of claim 1 wherein said cover plate has a peripheral edge portion which extends outwardly of said arms.

8. The closure cover member of claim 7 wherein said peripheral edge portion is formed of a material different than the portion of said cover plate inwardly of said peripheral edge portion.

9. The closure cover member of claim 1 wherein said arms include a reinforcement rib in the area where they join the cover plate.

* * * * *